US008087807B2

(12) United States Patent
Liu et al.

(10) Patent No.: US 8,087,807 B2
(45) Date of Patent: Jan. 3, 2012

(54) LED LAMP

(75) Inventors: You-Xue Liu, Shenzhen (CN); Li He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 333 days.

(21) Appl. No.: 12/565,729

(22) Filed: Sep. 23, 2009

(65) Prior Publication Data

US 2010/0309664 A1 Dec. 9, 2010

(30) Foreign Application Priority Data

Jun. 5, 2009 (CN) .......................... 2009 1 0302992

(51) Int. Cl.
*B60Q 1/06* (2006.01)

(52) U.S. Cl. ......................... 362/373; 362/294; 362/431

(58) Field of Classification Search ............... 362/249.1, 362/268, 296.01–297, 307, 367, 346, 327–328, 362/311.01–311.02, 235–237, 240, 244, 362/245, 247, 249.01, 249.02, 294, 373, 362/431

See application file for complete search history.

(56) References Cited

U.S. PATENT DOCUMENTS

| | | | | |
|---|---|---|---|---|
| 7,237,936 | B1 * | 7/2007 | Gibson | 362/547 |
| 2008/0080162 | A1 * | 4/2008 | Wilcox et al. | 362/20 |

* cited by examiner

*Primary Examiner* — Julie Shallenberger

(74) *Attorney, Agent, or Firm* — Altis Law Group, Inc.

(57) ABSTRACT

An LED lamp includes a plurality of LED light units, a connecting member engaged with first ends of the LED light units, a mounting member engaged with second ends of the LED light units, and two strengthening members. The LED light units are juxtaposed together and placed side by side. Each LED light unit comprises a heat sink and a plurality of LED modules engaged with a bottom of the heat sink. The strengthening members extend through two outmost side portions of the LED light units and connecting the connecting member and the mounting member to support the LED light units.

16 Claims, 5 Drawing Sheets

LED LAMP

BACKGROUND

1. Technical Field

The present disclosure relates to an LED (light emitting diode) lamp and, more particularly, to an LED lamp using a plurality of juxtaposed LED light units for various illuminating requirements.

2. Description of Related Art

An LED lamp utilizing LEDs as a source of illumination is widely used in many fields because the LEDs have features of long-term reliability, environment friendliness and low power consumption. It is well-known that a conventional grille lamp utilizes fluorescent lights as a source of illumination. With the development of the LED lamp, the LED lamp is intended to be a cost-effective yet high quality replacement for the conventional grille lamp.

Generally, the LED lamp comprises a bracket integrally formed via a die and a plurality of LED modules received in the bracket. The LED lamp can achieve a fixed illumination intensity because a dimension of the bracket is fixed. For achieving different illumination intensities according to different needs, the dimension of the bracket has to be changed. However, a change of the die of the bracket raises a considerable cost burden. Furthermore, to have different dies with different sizes require a high manufacture, inventory and material cost.

What is needed, therefore, is an LED lamp whose light intensity can be easily adjusted by increasing or decreasing the number of LEDs thereof for meeting different illumination demands.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
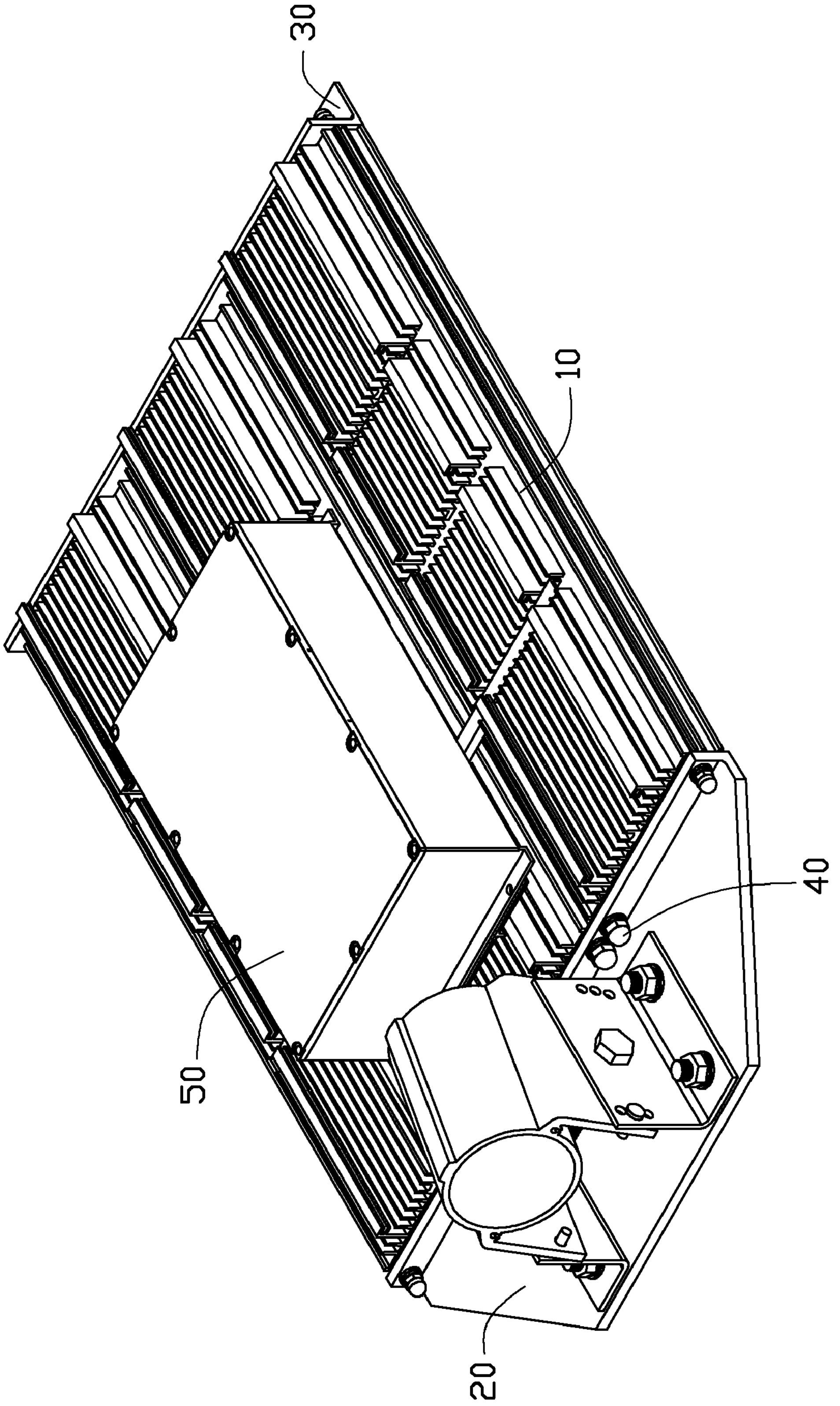
FIG. 1 is an isometric, assembled view of an LED lamp in accordance with an embodiment of the disclosure.
Figure 2:
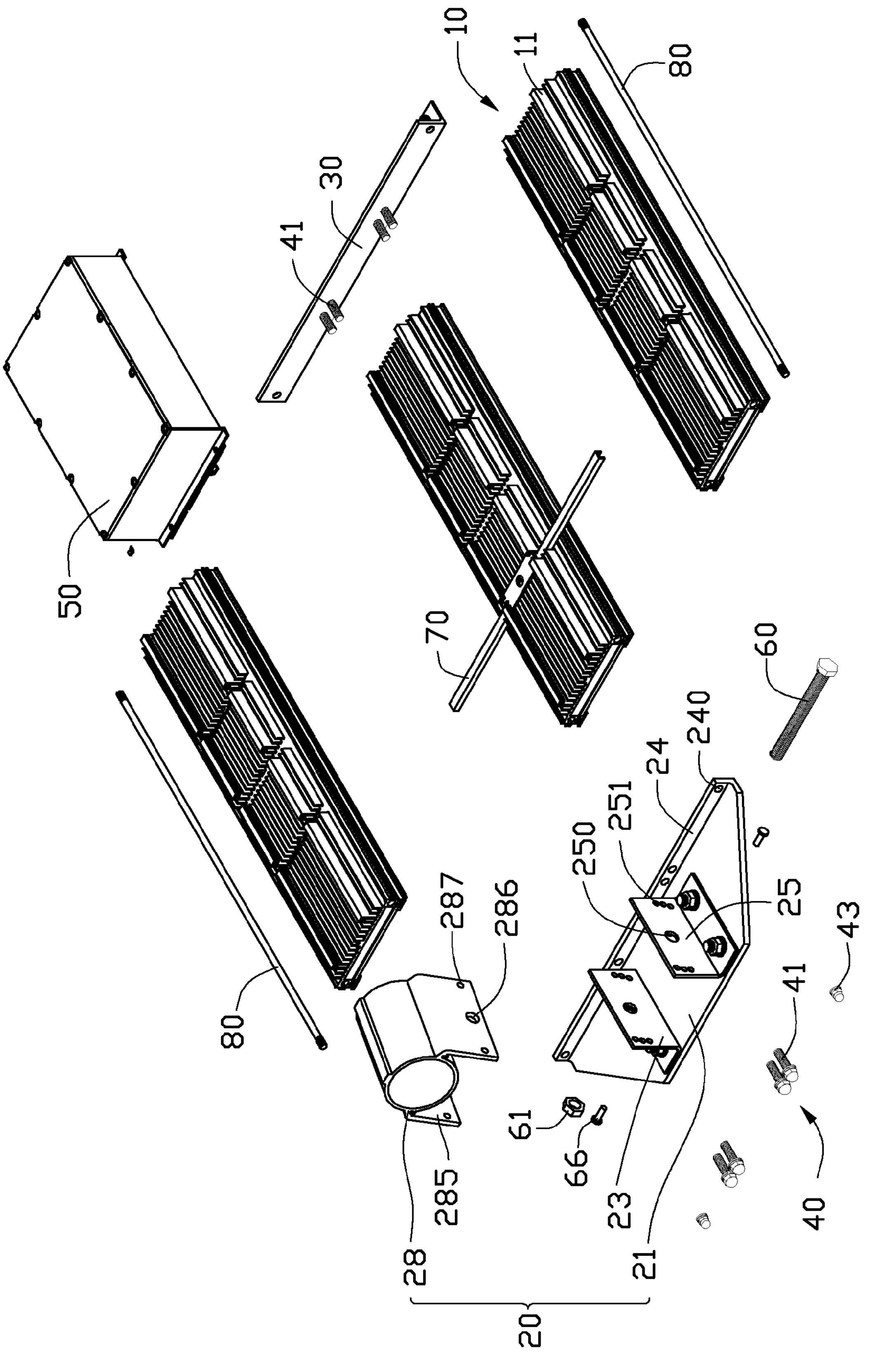
FIG. 2 is an exploded view of the LED lamp of FIG. 1.
Figure 3:
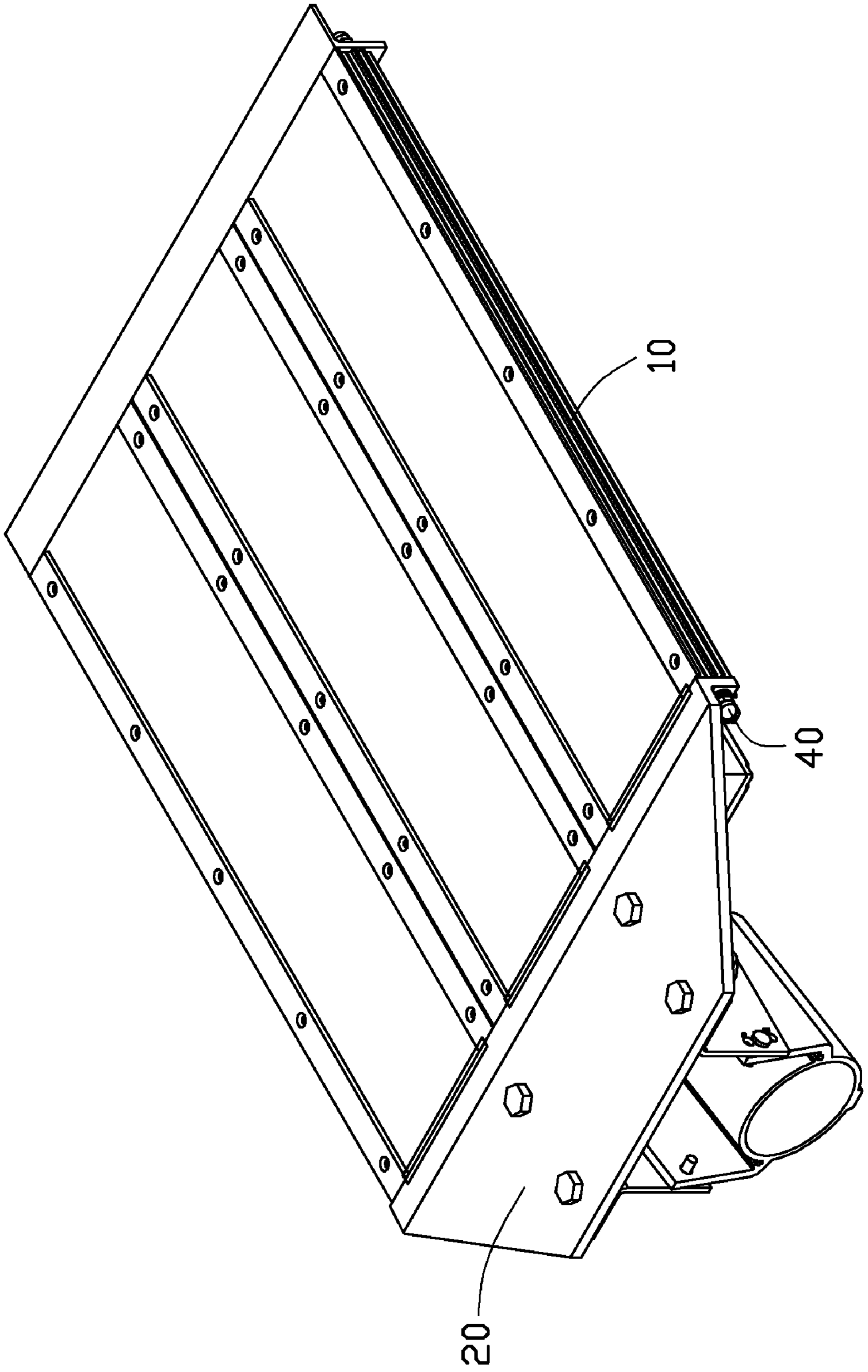
FIG. 3 is an inverted view of the LED lamp of FIG. 1.

Referring to FIGS. 1-3, an LED lamp in accordance with an embodiment of the disclosure is illustrated. The LED lamp comprises a plurality of LED light units 10 juxtaposed with each other, a connecting member 20 connecting front ends of the light units 10, and a mounting member 30 connecting rear ends of the light units 10. The LED light units 10 are placed side by side and contact each other. Two long strengthening members 80 extend through two outmost side portions of the LED light units 10 to join with the connecting member 20 and the mounting member 30. A plurality of fasteners 40 extend through the connecting member 20 and the mounting member 30 to threadedly engage with the LED light units 10. A power module 50 is mounted on a top of the light units 10.

The mounting member 30 has a plate-like shape. The connecting member 20 comprises a holder 21 engaging with the light units 10, and a sleeve 28 pivotally engaging with the holder 21. The holder 21 has a plate-like shape. A flange 24 extends perpendicularly from a front end of the holder 21. The flange 24 defines a plurality of horizontal holes 240 for extension of the strengthening members 80 and the fasteners 40 there through. Two brackets 23 are fixed on the holder 21 via a plurality of screws (not labeled). Each bracket 23 has a vertical portion 25 defining a central hole 250 and three pairs adjusting holes 251 at two lateral sides of the central hole 250. The sleeve 28 downwardly extends a pair of wings 285 from two lateral portions thereof. Each wing 285 defines a central hole 286 corresponding to the central hole 250 of the bracket 23, and a pair of adjusting holes 287 for aligning with one of the three pairs of adjusting holes 251 of the bracket 23. A long screw 60 extends through the central holes 250, 286 and threadedly engages with a nut 61 whereby the holder 21 can rotate relative to the sleeve 28 to adjust an elevation angle of the LED lamp. The sleeve 21 is used for securely connecting with a mounting post (not shown) of the LED lamp. At the desired elevation angle, screws 66 are extended through the corresponding adjusting holes 251 and threadedly engaged in the corresponding adjusting holes 287 to securely fix the holder 21 at the desired elevation angle.

Figure 4:
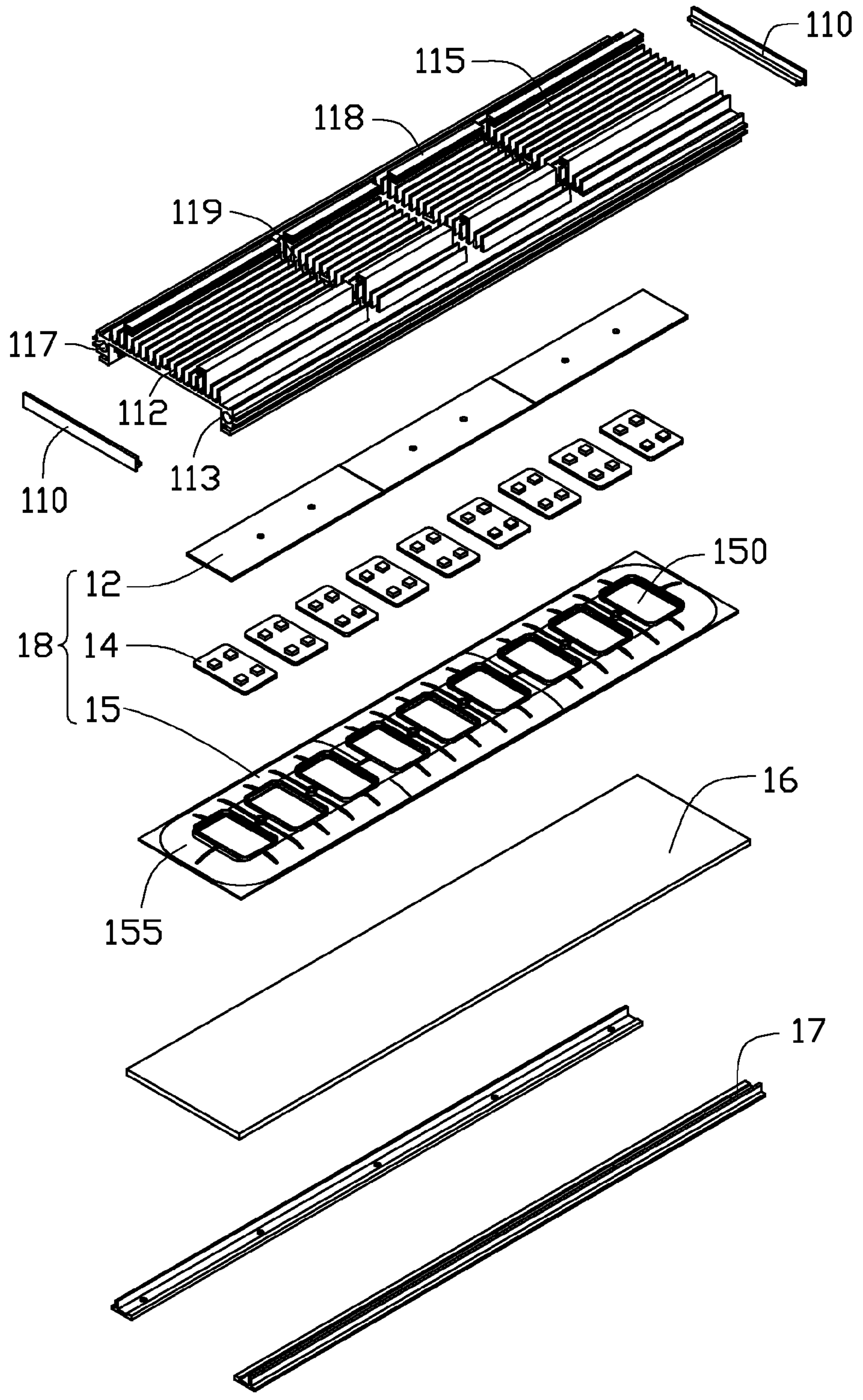
FIG. 4 is an exploded view of an LED light unit of the LED lamp of FIG. 1.
Figure 5:
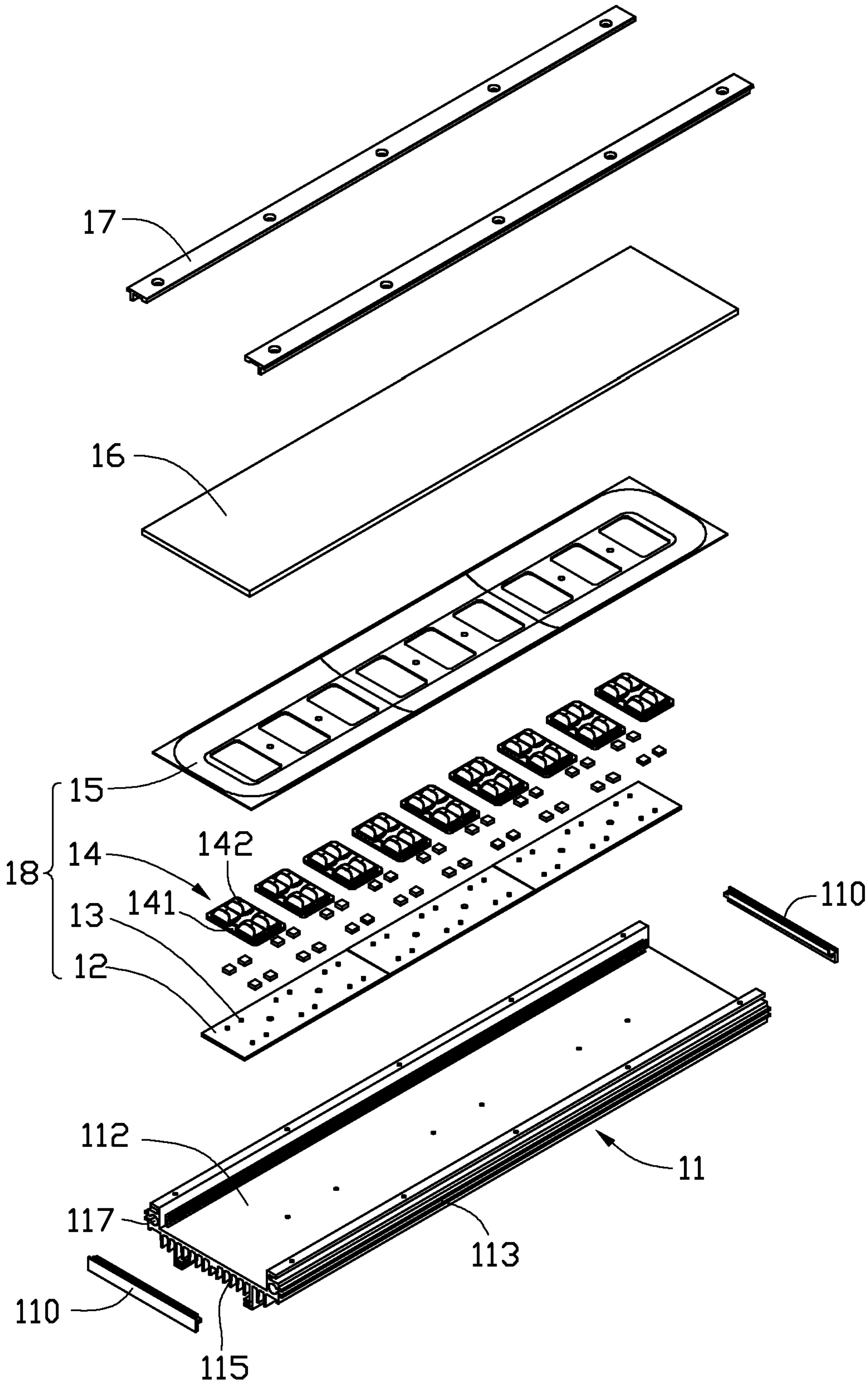
FIG. 5 is an inverted view of the LED light unit of FIG. 4.

Referring to FIGS. 4-5, each LED lamp unit 10 comprises a heat sink 11, a plurality of LED modules 18, a transparent plate 16, and two fixing strips 17 mounting the transparent plate 16 on the heat sink 11.

The heat sink 11 is integrally formed of a metal with a good heat conductivity such as aluminum, copper or an alloy thereof. In this embodiment, the heat sink 11 is made of aluminum extrusion and is extruded along a direction from rear end to front end of the heat sink 11; thus, the heat sink 11 can be manufactured into different lengths without redesign of a mould/die. The heat sink 11 comprises a heat spreader 112, and two walls 113 extending downwardly from two lateral edges of the heat spreader 112, respectively. Each of the walls 113 defines a through hole 117 in communication with the rear and front ends of the heat sink 11. A plurality of fins 115 extend upwardly from a top surface of the heat spreader 112. Two shoulders 118 extend upwardly from the top surface of the heat spreader 112 beyond the fins 115. Each shoulder 118 is F-shaped and higher than the fins 115 thereby to support the power module 50 thereon. The fins 115 and the shoulders 118 define a plurality of transverse grooves 119. A long bar 70 is mounted in one groove 119 to receive and protect wires (not shown) in connection with the LED modules 18 in the LED lamp units 10 and the power module 50.

The LED modules 18 are placed end-to-end on the heat spreader 112 along a lengthwise direction of the light unit 10 from the rear end to the front end thereof. Each LED module 18 includes a printed circuit board 12, a plurality of LEDs 13 mounted on the printed circuit board 12, a plurality of lens 14 covering the LEDs 13 respectively, and a reflector 15 enclosing the LEDs 13. An amount of the LED modules 18 is three; in other embodiments, the amount of the LED modules can be various, according to a length of the LED lamp unit 10.

The LEDs 13 of each LED module 18 are arrayed in two rows on the printed circuit board 12. Each lens 14 may be made from a transparent material, such as epoxy resin, polymethyl methacrylate (PMMA), and so on. Each lens 14 includes a base 141 and four domes 142 projecting upwardly from a top face of the base 141. Each dome 142 defines a cavity (not shown) at a bottom thereof for receiving the LED 13 therein. An outer portion 155 surrounding the reflectors 155 is concave to reflect light generated by LEDs 13. A central area of each reflector 15 is plate-like and defines three openings 150. The reflectors 15 abut against the bases 141 of the lenses 14 with the domes 142 extending through the openings 150 of the reflectors 15.

Referring to FIG. 4 also, in assembly of each LED lamp unit 10, the LED modules 18 are mounted on a bottom of the heat spreader 112. Two blocks 110 are mounted on rear and front ends of the heat sink 11 and engaged with front edge of front one and rear edge of rear one of the LED modules 18. In this embodiment, the blocks 110 are formed of aluminum and soldered to front and rear ends of the heat sink 11. The blocks 110 and the walls 113 of the heat sink 11 cooperatively form a rectangular, annular step (not labeled) on bottoms thereof to receive a rectangular, annular waterproof gasket (not shown) thereon. The transparent plate 16 is mounted on the waterproof gasket. Finally, the fixing strips 17 are mounted on the bottoms of the walls 113 and abut against the transparent plate 16 upwardly. The fixing strips 17 are secured to the bottoms of the walls 113 by a plurality of screws (not shown).

In assembly of LED lamp, the LED lamp units 10 are juxtaposed with each other; in other words, the LED lamp units 10 are placed side by side. The mounting member 30 and the connecting member 20 engage with the front and rear ends of the heat sinks 11 of the LED lamp units 10 via the fasteners 40. In this embodiment, the fasteners 40 include a plurality of screws 41 and a plurality of nuts 43. The strengthening members 80 extend through two through holes 117 of outmost portions of the LED light units 10, the connecting member 20, and the mounting member 30 to engage with the nuts 43. Finally, the power module 50 is mounted on the shoulders 118 of the heat sinks 11 of the LED light units 10.

Since the LED light units 10 are juxtaposed with each other and an amount of the LED light units 10 can be changed, a transverse width of the LED lamp can be changed for various illuminating requirements. In addition, the aluminum extrusion type heat sink 11 can be cut into a needed length to change a length of the LED lamp. The dimension and configuration of the LED lamp can be changed without designing and using a new mould/die, whereby the cost of the LED lamp can be considerably reduced.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) lamp, comprising:

a plurality of LED light units juxtaposed together and placed side by side, each LED light unit comprising a heat sink and a plurality of LED modules engaged with a bottom of the heat sink;

a connecting member engaged with first ends of the LED light units;

a mounting member engaged with second ends of the LED light units; and two strengthening members extending through two outmost side portions of the LED light units and connecting the connecting member and the mounting member to support the LED light units;

wherein the heat sink of each LED light unit is made of aluminum extrusion and is extruded along a direction from the first end to the second end of the heat sink; and wherein the heat sink comprises a heat spreader and two walls extending downwardly from two lateral edges of the heat spreader, each wall defining a through hole along the extruded direction of the heat sink, each strengthening member being received in a corresponding through hole.

2. The LED lamp as claimed in claim 1, wherein the heat sink further comprises two blocks made of aluminum and soldered at the second and first ends of the heat sink to enclose the LED modules of the heat sink.

3. The LED lamp as claimed in claim 2, wherein the blocks and the walls of the heat sink cooperatively define a step at bottoms thereof for receiving a transparent plate thereon.

4. The LED lamp as claimed in claim 1, wherein each of the LED modules comprises a plurality of LEDs, a plurality of lenses covering the LEDs and a reflector, each of the lens comprising a base abutting the reflector and a plurality of domes extending through the reflector.

5. The LED lamp as claimed in claim 1, wherein the connecting member comprises a holder connecting with the LED lamp units and a sleeve pivotally engaging with the holder.

6. The LED lamp as claimed in claim 5, wherein the connecting member further comprise two brackets mounted on the holder, the sleeve having a pair of wings pivotally engaging with the brackets.

7. The LED lamp as claimed in claim 1, wherein the heat sink has a plurality of fins defining a groove to receive a transverse bar for protecting wires in connection with the LED modules.

8. An LED (light emitting diode) lamp, comprising:

a plurality of LED light units placed side by side, each LED light unit comprising a heat sink and a plurality of LED modules engaged with a bottom of the heat sink;

a first plate engaged with first ends of the LED light units;

a second plate engaged with second ends of the LED light units;

two strengthening members extending through two outmost side portions of the LED light units and connecting the first and second plates to support the LED light units; and a plurality of fasteners extending through the first plate and the second plate and threadedly engaging with the LED light units;

wherein the heat sink of each LED light unit is made of aluminum extrusion and is extruded along a direction from the first ends to the second ends of the LED light units; and wherein the heat sink comprises a heat spreader and two walls extending downwardly from two lateral edges of the heat spreader, each wall defining a through hole along the extruded direction of the heat sink, each of the strengthening members being received in a corresponding through hole.

9. The LED lamp as claimed in claim 8, wherein the heat sink further comprises two blocks made of aluminum and soldered at the second and first ends of the heat sink to enclose the LED modules of the heat sink.

10. The LED lamp as claimed in claim 9, wherein the blocks and the walls of the heat sink cooperatively define a step at bottoms thereof for receiving a transparent plate thereon.

11. The LED lamp as claimed in claim 8, wherein each of the LED modules comprises a plurality of LEDs, a plurality of lenses covering the LEDs and a reflector, each of the lens comprising a base abutting the reflector and a plurality of domes extending through the reflector.

12. The LED lamp as claimed in claim 8, wherein the heat sink has a plurality of fins defining a groove to receive a transverse bar for protecting wires in connection with the LED modules.

13. An LED (light emitting diode) lamp, comprising:

a plurality of LED light units juxtaposed together and placed side by side, each LED light unit comprising a heat sink and a plurality of LED modules engaged with a bottom of the heat sink;

a connecting member engaged with first ends of the LED light units;

a mounting member engaged with second ends of the LED light units; and two strengthening members extending through two outmost side portions of the LED light units and connecting the connecting member and the mounting member to support the LED light units;

wherein the connecting member comprises a holder connecting with the LED lamp units and a sleeve pivotally engaging with the holder.

14. The LED lamp as claimed in claim 13, wherein each of the LED modules comprises a plurality of LEDs, a plurality of lenses covering the LEDs and a reflector, each of the lens comprising a base abutting the reflector and a plurality of domes extending through the reflector.

15. The LED lamp as claimed in claim 13, wherein the connecting member further comprise two brackets mounted on the holder, the sleeve having a pair of wings pivotally engaging with the brackets.

16. The LED lamp as claimed in claim 13, wherein the heat sink has a plurality of fins defining a groove to receive a transverse bar for protecting wires in connection with the LED modules.

* * * * *